United States Patent
So et al.

(10) Patent No.: US 12,531,380 B2
(45) Date of Patent: Jan. 20, 2026

(54) CONNECTING ASSEMBLY AND ASSEMBLY-DETACHABLE INTELLIGENT APPARATUS

(71) Applicant: SOLOS TECHNOLOGY (SHENZHEN) LIMITED, Guangdong (CN)

(72) Inventors: Chiu Ming So, Guangdong (CN); Wai Kuen Cheung, Guangdong (CN); Kwok Wah Law, Guangdong (CN)

(73) Assignee: SOLOS TECHNOLOGY (SHENZHEN) LIMITED, Shenzhen (CN)

( * ) Notice: Subject to any disclaimer, the term of this patent is extended or adjusted under 35 U.S.C. 154(b) by 600 days.

(21) Appl. No.: 18/053,383

(22) Filed: Nov. 8, 2022

(65) Prior Publication Data

US 2023/0068202 A1 Mar. 2, 2023

Related U.S. Application Data

(63) Continuation of application No. PCT/CN2020/140405, filed on Dec. 28, 2020.

(30) Foreign Application Priority Data

Jul. 7, 2020 (CN) .......................... 202021314784.2

(51) Int. Cl.
*H01R 13/66* (2006.01)
*G02C 5/14* (2006.01)
(Continued)

(52) U.S. Cl.
CPC ......... *H01R 13/6675* (2013.01); *G02C 5/146* (2013.01); *G02C 11/10* (2013.01);
(Continued)

(58) Field of Classification Search
CPC ................ H01R 13/6675; H01R 13/24; H01R 13/6205; H01R 13/6271; H01R 13/631;
(Continued)

(56) References Cited

U.S. PATENT DOCUMENTS

| | | | | |
|---|---|---|---|---|
| 7,677,721 B2* | 3/2010 | Siu | .......................... | G02C 11/02 351/52 |
| 8,297,749 B2* | 10/2012 | Chen | ........................ | G02C 9/00 351/44 |

(Continued)

FOREIGN PATENT DOCUMENTS

| | | |
|---|---|---|
| CN | 107594778 A | 1/2018 |
| CN | 208354804 U | 1/2019 |

OTHER PUBLICATIONS

International Search Report of PCT Patent Application No. PCT/CN2020/140405 issued on Apr. 9, 2021.

*Primary Examiner* — Thanh Tam T Le

(57) ABSTRACT

The present invention discloses a connecting assembly, applied to the technical field of wearable devices. The connecting assembly is used for connecting a main body assembly and an electric control assembly of an assembly-detachable intelligent apparatus, and includes a first connector. The connecting assembly is detachably connected to the main body assembly in a first connecting mode. The main body assembly is electrically connected to the first connector. The electric control assembly includes a second connector. The connecting assembly is detachably connected to the electric control assembly in a second connecting mode and/or a third connecting mode. The first connector is electrically connected to the second connector. The present invention further discloses an assembly-detachable intelligent apparatus, which includes a main body assembly, an electric control assembly and a connecting assembly.

19 Claims, 14 Drawing Sheets

(51) Int. Cl.
  *G02C 11/00*   (2006.01)
  *H01R 13/24*   (2006.01)
  *H01R 13/62*   (2006.01)
  *H01R 13/627*  (2006.01)
  *H01R 13/631*  (2006.01)
  *H01R 13/633*  (2006.01)

(52) U.S. Cl.
  CPC ......... *H01R 13/24* (2013.01); *H01R 13/6205* (2013.01); *H01R 13/6271* (2013.01); *H01R 13/631* (2013.01); *H01R 13/633* (2013.01); *G02C 2200/08* (2013.01)

(58) Field of Classification Search
  CPC ...... H01R 13/633; G02C 5/146; G02C 11/10; G02C 2200/08
  See application file for complete search history.

(56) References Cited

U.S. PATENT DOCUMENTS

| | | | | |
|---|---|---|---|---|
| 9,647,386 | B2* | 5/2017 | Andrus | A61M 60/878 |
| 9,910,298 | B1* | 3/2018 | Sales | G02C 11/10 |
| 10,396,491 | B2* | 8/2019 | Hsu | H01R 13/6205 |
| 10,559,917 | B2* | 2/2020 | Wang | H01R 13/745 |
| 10,670,888 | B1* | 6/2020 | Yang | G02C 11/10 |
| 10,802,617 | B2* | 10/2020 | Lin | G06F 3/03545 |
| 11,128,087 | B2* | 9/2021 | Zhang | H01R 13/521 |
| 11,226,494 | B2* | 1/2022 | Lin | G02B 27/017 |
| 11,294,204 | B2* | 4/2022 | Kan | G06F 3/044 |
| 11,307,422 | B2* | 4/2022 | Moore | G02B 27/0176 |
| 11,333,905 | B2* | 5/2022 | Zhang | H01Q 21/28 |

\* cited by examiner

CONNECTING ASSEMBLY AND ASSEMBLY-DETACHABLE INTELLIGENT APPARATUS

CROSS REFERENCE TO RELATED APPLICATIONS

This application is a Continuation application of International Patent Application No. PCT/CN2020/140405, filed on Dec. 28, 2020, which claims priority of Chinese Patent Application No. 202021314784.2, filed on Jul. 7, 2020, the entire contents of which are hereby incorporated by reference.

TECHNICAL FIELD

The present invention relates to the technical field of wearables, and in particular to a connecting assembly and an assembly-detachable intelligent apparatus.

BACKGROUND

With the development of wearable technology, intelligent wearables, such as intelligent glasses, are used more widely. However, some questions need to be improved are also exposed during in use.

Existing intelligent wearables are generally assembled as a whole and are undetachable. During in use, it is possible that a portion of the intelligent wearables has problems, for example, a certain part is damaged or the battery is low and needs to be charged; and, it is also possible that different types of parts need to be replaced in different occasions or scenarios, for one example, sunglasses are needed when the intelligent glasses are worn outdoors, while the sunglasses need to be replaced with myopic glasses or other functional glasses when enters the room, for another example, the user needs to change the style of parts and components as decoration according to the occasion, and the undetachable structure will affect the use of the whole intelligent wearables, which results inconvenience to the user.

SUMMARY

The present invention provides a connecting assembly and an assembly-detachable intelligent apparatus, which aims to solve the problem of inconvenient use of the apparatus caused by the un-detachability of the intelligent wearables.

An embodiment of the present invention provides a connecting assembly, configured for connecting a main body assembly and an electric control assembly of an assembly-detachable intelligent apparatus, comprising a first connector; a first connecting end of the connecting assembly being detachably connected to a connecting end of the main body assembly in a first connecting mode, and the main body assembly being electrically connected to the first connector; the electronic control assembly comprising a second connector, a second connecting end of the connecting assembly being detachably connected to a connecting end of the electronic control assembly in a second connecting mode and/or a third connecting mode, and the first connector being electrically connected to the second connector.

Further, male pogopins are provided at an outside of the connecting end of the first connector, and female pogopins are provided at an outside of the connecting end of the second connector; wherein when the first connector and the second connector are connected, the male pogopins and the female pogopins contact with each other, and the first connector and the second connector are electrically connected.

Further, a magnetic member with a first magnetic pole is provided at the outside of the connecting end of the first connector, a magnetic member with a second magnetic pole opposite to the first magnetic pole is provided at the outside of the connecting end of the second connector, and the second connecting end of the connecting assembly is detachably connected to the connecting end of the electronic control assembly by magnetic attraction through attraction of the first magnetic pole and the second magnetic pole.

Further, a male interface with a latch is provided at the second connecting end of the connecting assembly, a female interface matching the male interface is provided at the connecting end of the electric control assembly, the second connecting end of the connecting assembly and the connecting end of the electronic control assembly are detachably connected by snap-fit connection, and the latch prevents the male interface disengaging from the female interface after the male interface and the female interface are connected.

Further, a release button is provided at a position of the outside of the electronic control assembly corresponding to the latch, when a pressure is applied on a surface of the release button, the latch is linked, and the male interface and the female interface are disengaged.

Further, the male interface is provided with a first guiding groove, and the female interface is provided with a second guiding groove matching the first guiding groove.

Further, the connecting assembly further comprises a rotary connecting shaft, the connecting end of the main body assembly defines a first shaft hole, the first connecting end of the connecting assembly defines a second shaft hole, the rotary connecting shaft extends through the first shaft hole and the second shaft hole to detachably connect the connecting end of the main body assembly and the first connecting end of the connecting assembly in a rotary shaft connection, and the connecting assembly is rotatably connected to the main body assembly within a rotation limiting range of the rotary connecting shaft.

Further, the main body assembly comprises an electric device, and power wires of the electric device extend outwardly through the connecting end of the main body assembly and are detachably connected to the first connector of the connecting assembly.

Further, the connecting assembly further comprises an observing window and a cover detachably packaged on the observing window, the observing window is defined at a position where the power wires and the first connector are connected.

An embodiment of the present invention also provides an assembly-detachable intelligent apparatus, including a main body assembly, an electric control assembly and a connecting assembly; the connecting assembly comprising a first connector, a connecting end of the main body assembly being detachably connected to a first connecting end of the connecting assembly in a first connecting mode, and the main body assembly being electrically connected to the first connector; the electronic control assembly comprising a second connector, a second connecting end of the connecting assembly being detachably connected to a connecting end of the electronic control assembly in a second connecting mode and/or a third connecting mode, and the first connector being electrically connected to the second connector.

Further, a rechargeable power supply and a control circuit board are provided on the electronic control component.

Further, the assembly-detachable intelligent apparatus is intelligent glasses, the main body assembly is a frame of the intelligent glasses, and the connecting assembly is a rotary shaft interconnecting the frame and legs of the intelligent glasses.

It can be seen from the embodiments of the present invention that: the connecting assembly includes the first connector, and is used for connecting the main body assembly and the electronic control assembly. The first end of the connecting assembly is detachably connected to the connecting end of the main body assembly in the first connecting mode, and the main body assembly is electrically connected to the first connector. The electronic control assembly includes a second connector, and the second end of the connecting assembly is detachably connected to the connecting end of the electronic control assembly in the second connecting mode and/or the third connecting mode. The first connector is electrically connected to the second connector. The connecting assembly detachably connects the main body assembly with the electronic control assembly. Connections between the main body assembly and the first connector and between the first connector and the second connector are in detachable mode, which improves the convenience of replacing the assemblies, and meanwhile ensures functions of power supply, electric control and etc. of the electronic control assembly to the main body assembly through the electrical connection of the first connector and the second connector.

BRIEF DESCRIPTION OF THE DRAWINGS

In order to illustrate the embodiments of the present invention or the technical solutions in the prior art more clearly, drawings that need to be used in the description of the embodiments or the prior art will be briefly described below. It is obvious that the drawings described below are only some embodiments of the present invention.

DESCRIPTION OF THE EMBODIMENTS

For better illustrating and understanding the purpose, features and advantages of the present invention, detailed description will be given for the embodiments provided by the present invention with reference to the append drawings. Obviously, the described embodiments are only a part of the embodiments, and not all of the embodiments of the present invention. Based on the embodiments of the present invention, all other embodiments obtained by those skilled in the art without any creative work should be in the scope of this application.

Figure 1:
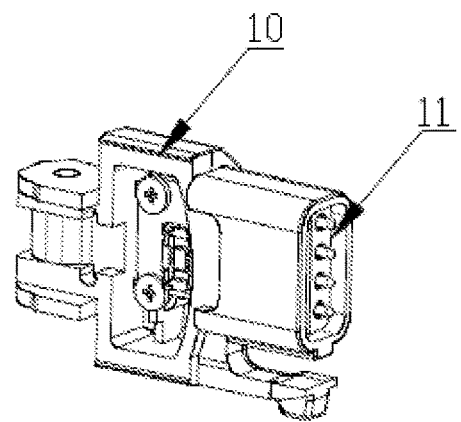
FIG. 1 is a schematic view of a connecting assembly provided by an embodiment of the present invention.
Figure 2:
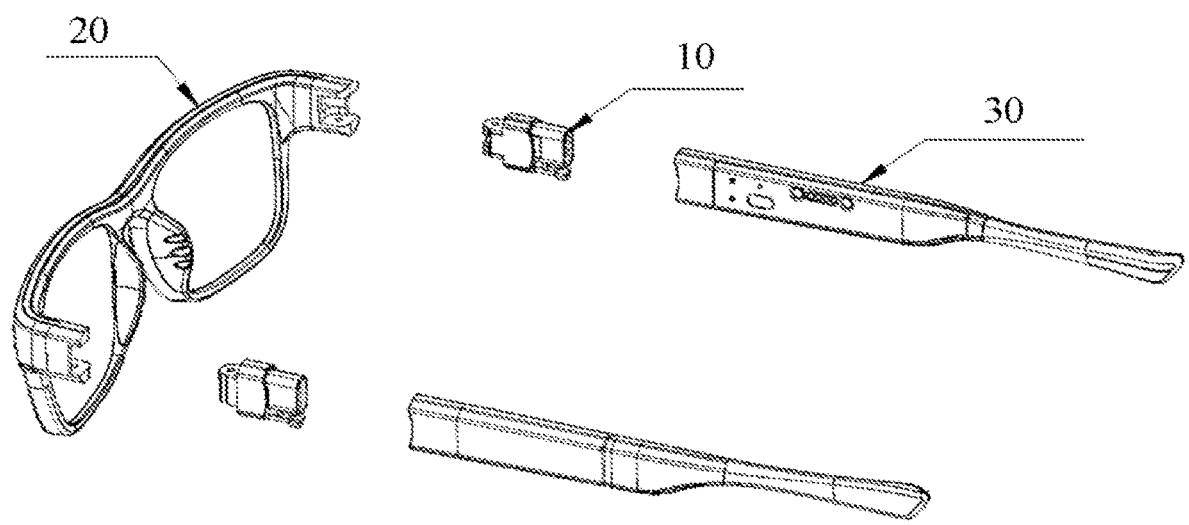
FIG. 2 is an exploded view of the connecting assembly provided by the embodiment of the present invention, which is applied in an assembly-detachable intelligent apparatus.
Figure 3:
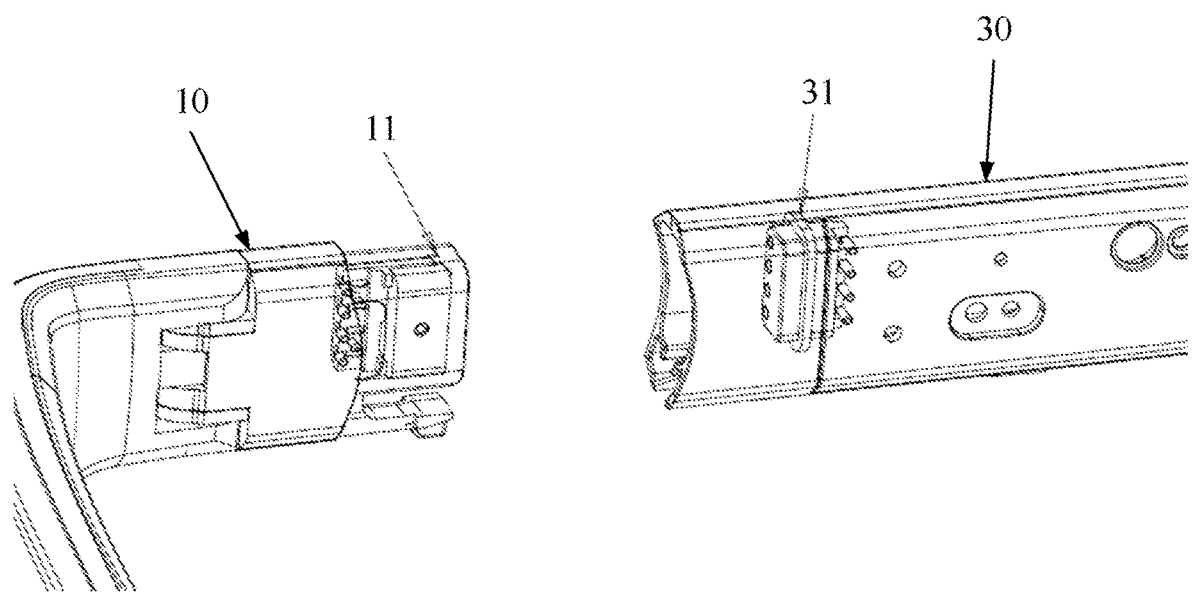
FIG. 3 is another schematic view of the connecting assembly provided by the embodiment of the present invention.

Referring to FIG. 1 to FIG. 3, FIG. 1 is a schematic view of a connecting assembly provided by an embodiment of the present invention, FIG. 2 is an exploded view of the connecting assembly applied in an assembly-detachable intelligent apparatus, and FIG. 3 is another schematic view of the connecting assembly. The connecting assembly 10 is one of the assemblies of the assembly-detachable intelligent apparatus. The connecting assembly 10 is used for connecting a main body assembly 20 and an electronic control assembly 30 of the assembly-detachable intelligent apparatus. The main body assembly 20 may be an assembly capable of realizing intelligent vision and other functions, such as a visual helmet, a pair of intelligent glasses and etc., which are capable of displaying images. The electronic control assembly 30 may be an assembly capable of realizing circuit control. The electronic control component 30 may include a power supply, a control circuit board (PCB, printed circuit board), and etc., wherein the power supply may be a rechargeable power supply that can be used repeatedly. For example, the electronic control component 30 may be a leg of the intelligent glasses provided with a charging power supply and/or a PCB. The connecting assembly 10 is used for connecting the main body assembly 20 and the electronic control assembly 30, for example, may be a rotary shaft connecting a frame and a leg of the intelligent glasses. For facilitating description, FIG. 1 takes the intelligent glasses as an example of the assembly-detachable intelligent apparatus. The connecting assembly mainly includes a first connector 11.

The connecting assembly 10 includes two connecting ends, wherein a first connecting end is detachably connected to a connecting end of the main body assembly 20 in a first connecting mode, and the main body assembly 20 is electrically connected to the first connector 11. Specifically, it may be that electric connecting wires of the main body assembly 20 are detachably connected to the conductive connecting points of the first connector 11 through snap-fit, welding and etc.

The electronic control assembly 30 includes a second connector 31. A second connecting end of the connecting assembly 10 and a connecting end of the electronic control assembly 30 are detachably connected in a second connecting mode and/or a third connecting mode. At the same time, the first connector 11 and the second connector 31 are also connected in a detachable mode, such as magnetic attraction, press fitting and etc. The first connector 11 and the second connector 31 are electrically connected, and in particular, electrical connection may be realized by contacting of metal pogopins of the two connectors.

The electric control assembly 30 is provided with a power supply and a control circuit board. After the first connector 11 and the second connector 31 are electrically connected, functions such as power supply and electric control to the main body assembly 20 can be realized, thereby realizing various functions of the assembly-detachable intelligent apparatus.

In this embodiment, the connecting assembly includes the first connector, and is used for connecting the main body assembly and the electronic control assembly. The first end of the connecting assembly is detachably connected to the connecting end of the main body assembly in the first connecting mode, and the main body assembly is electrically connected to the first connector. The electronic control assembly includes a second connector, and the second end of the connecting assembly is detachably connected to the connecting end of the electronic control assembly in the second connecting mode and/or the third connecting mode. The first connector is electrically connected to the second connector. The connecting assembly detachably connects the main body assembly with the electronic control assembly. Connections between the main body assembly and the first connector and between the first connector and the second connector are in detachable mode, which improves the convenience of replacing the assemblies, and meanwhile ensures functions of power supply, electric control and etc. of the electronic control assembly to the main body assembly through the electrical connection of the first connector and the second connector.

Further, the first connecting mode may be rotary shaft connection, the second connecting mode may be magnetic attraction, and the third connecting mode may be snap-fit connection. The magnetic attraction may be applied separately: magnetic objects with opposing magnetic poles are respectively arranged on surfaces of the first connector 11 and the second connector 31 which face to each other, making the first connector 11 and the second connector 31 be connected together by magnetic attracting force generated therebetween. At this time, the second connecting end of the connecting assembly 10 and the connecting end of the electronic control assembly 30 may be without a snap-fit structure, and are directly connected together by the magnetic attracting force. The snap-fit connection also may be applied separately: the second connecting end of the connecting assembly 10 includes a male interface with a latch, and the connecting end of the electronic control assembly 30 includes a female interface matching the male interface. By means of the snap-fit of the male interface and the female interface, the second connecting end of the connecting assembly 10 is inserted into the connecting end of the electronic control assembly 30, thereby snapped together.

The snap-fit connection may be longitudinal snap-fit, or may be horizontal snap-fit. The magnetic attraction and the snap-fit connection may be applied simultaneously, i.e., the second connecting end of the connecting assembly 10 and the connecting end of the electronic control assembly 30 are detachably connected together by the magnetic attracting force between the first connector 11 and the second connector 31 and the snap force between the male interface and the female interface, which is more firmly compared with using alone one of the magnetic attraction and snap-fit connection.

Figure 4:
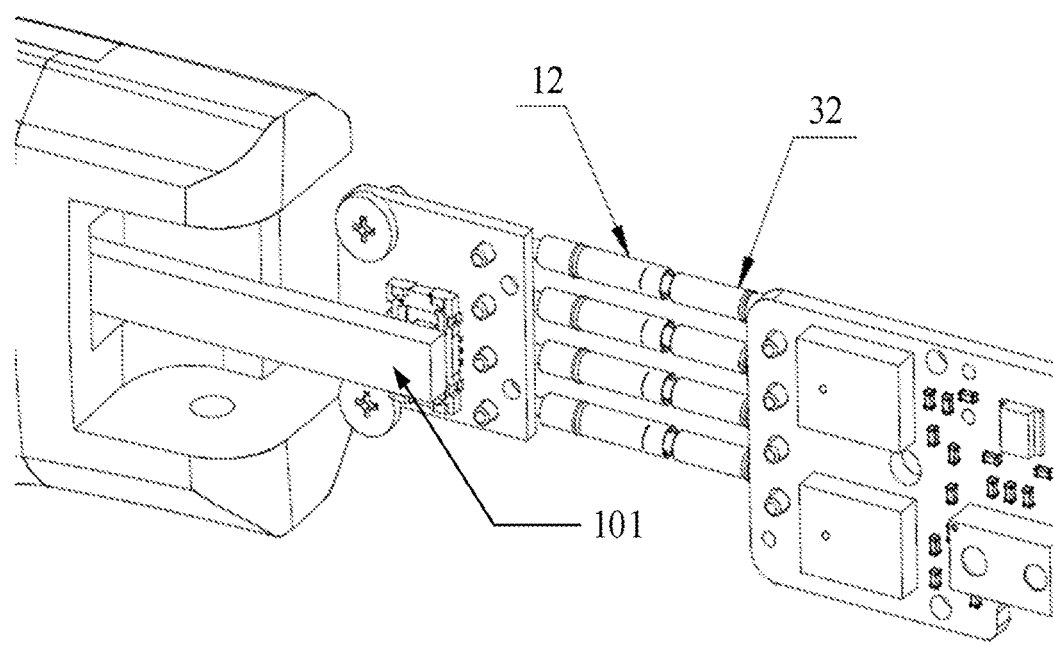
FIG. 4 is a schematic view of male and female pogopins of the connecting assembly provided by the embodiment of the present invention.

Specifically, referring to FIG. 4, male pogopins 12 are provided at an outside of the connecting end of the first connector 11, and female pogopins 32 are provided at an outside of the connecting end of the second connector 31. When the first connector 11 and the second connector 31 are connected, the male pogopins 12 and the female pogopins 32 contact with each other, thereby the first connector 11 and the second connector 31 are electrically connected. The male pogopins 12 and the female pogopins 32 both are made of conductive materials.

Figure 5:
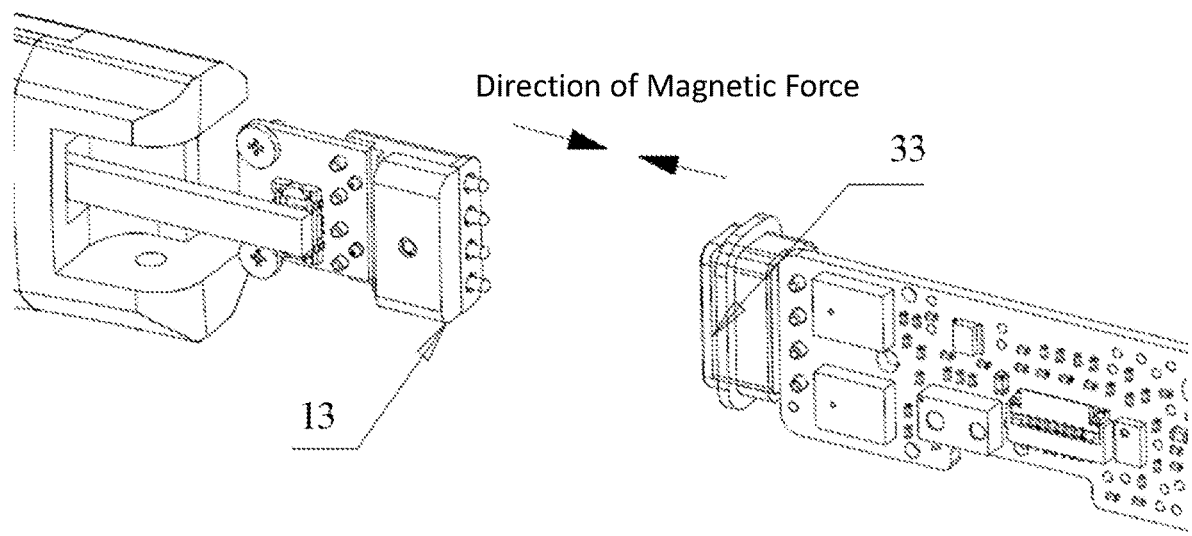
FIG. 5 is a schematic view of magnetic members of a connector of an electric control assembly and the connecting assembly provided by the embodiment of the present invention.

Referring to FIG. 5, a magnetic member 13 with a first magnetic pole is provided at the outside of the connecting end of the first connector 11, the magnetic member 13 may be a magnetic object such as a magnetite or a magnet. A magnetic member 33 with a second magnetic pole opposite to the first magnetic pole is provided at the outside of the connecting end of the second connector 31. For example, the first magnetic pole is the north magnetic pole (N-pole), and the second magnetic pole should be the south magnetic pole (S-pole). By means of attraction of the first magnetic pole and the second magnetic pole, the second connecting end of the connecting assembly 10 and the connecting end of the electronic control assembly 30 are detachably connected by magnetic attraction, and directions of the magnetic attracting force are shown by the arrows in FIG. 5.

Figure 6:
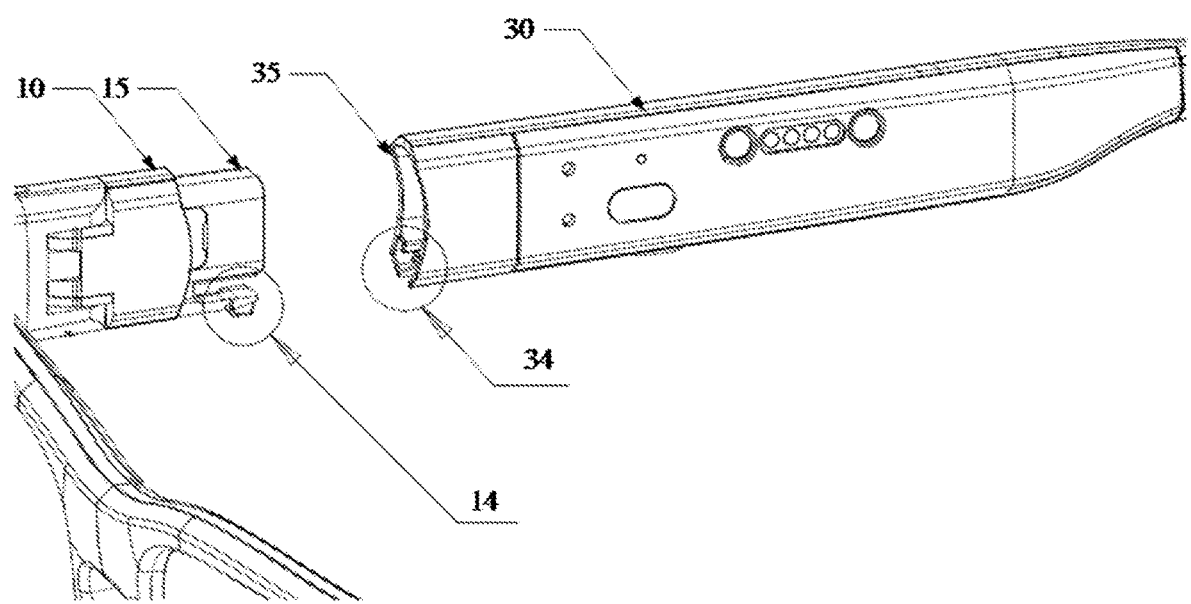
FIG. 6 is a schematic view of male and female interfaces of the connecting assembly provided by the embodiment of the present invention.
Figure 7:
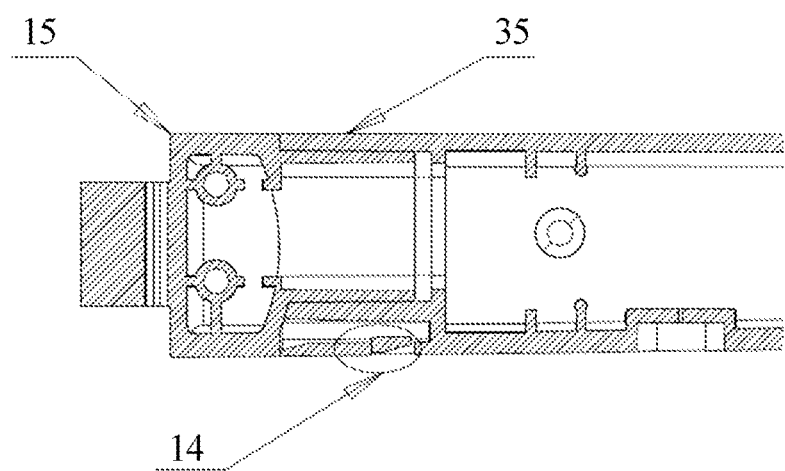
FIG. 7 is a cross-sectional view of the connecting assembly provided by the embodiment of the present invention, wherein the male and female interfaces are connected.

Referring to FIG. 6 to FIG. 7, FIG. 6 is a schematic view of the male and female interfaces of the connecting assembly, and FIG. 7 is a cross-sectional view of the male and female interfaces after being connected. The second connecting end of the connecting assembly 10 is provided with a male interface 15 with a latch 14, the connecting end of the electronic control assembly 30 is provided with a female interface 35 matching the male interface 15. Correspondingly, the female interface 35 is provided with a latching hole 34 corresponding to the latch 14. Specifically, the male interface 15, the female interface 35 and the latch 14 are all made of plastic. The second connecting end of the connecting assembly 10 and the connecting end of the electronic control assembly 30 are detachably connected in the snap-fit mode. The latch 14 prevents the male interface 15 disengaging from the female interface 35 after the male interface 15 and the female interface 35 are connected. When a pressure is applied on the latch 14, the latch 14 disengages from the latching hole 34 of the female interface 35, and thus the male interface 15 and the female interface 35 can be disassembled. Preferably, the latch 14 is formed at a bottom of the second connecting end of the connecting assembly 10, and the latching hole 34 is correspondingly formed at a bottom of the connecting end of the electronic control assembly 30. The bottom referred here means that: after the connecting assembly 10 interconnects the main body assembly 20 and the electronic control assembly 30 as a whole to form the assembly-detachable intelligent apparatus, a side of the assembly-detachable intelligent apparatus near a platform on which the assembly-detachable intelligent apparatus is natural placed. For example, when the intelligent glasses are assembled and placed on a table, a side of the intelligent glasses near the table is the bottom of the second connecting end of the connecting assembly 10 and the bottom of the connecting end of the electronic control assembly.

Figure 8:
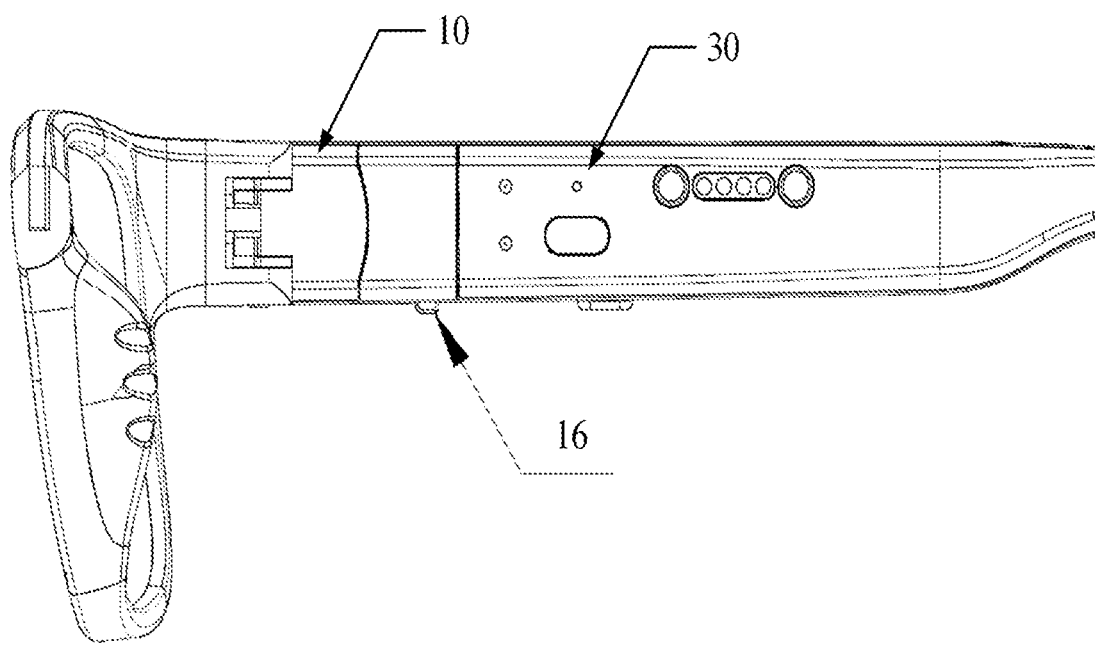
FIG. 8 is schematic view showing a position of a release button for the male and female interfaces of the connecting assembly provided by the embodiment of the present invention.
Figure 9:
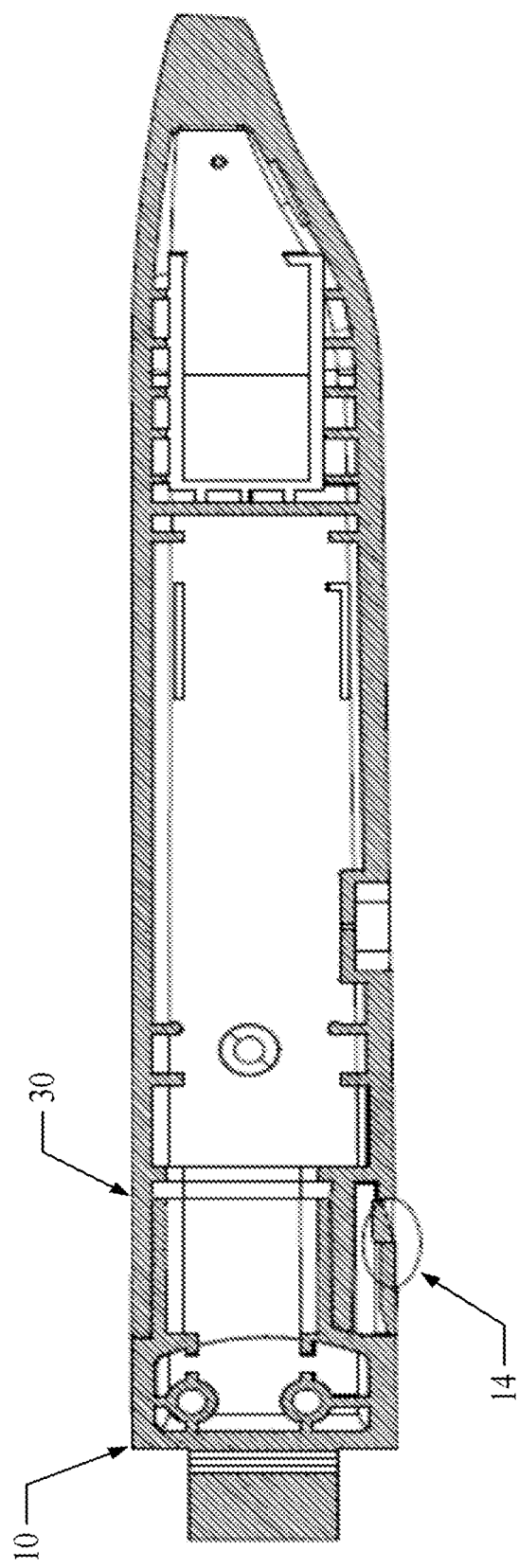
FIG. 9 is a cross-sectional view of the connecting assembly provided by the embodiment of the present invention, wherein the male and female interfaces are connected.
Figure 10:
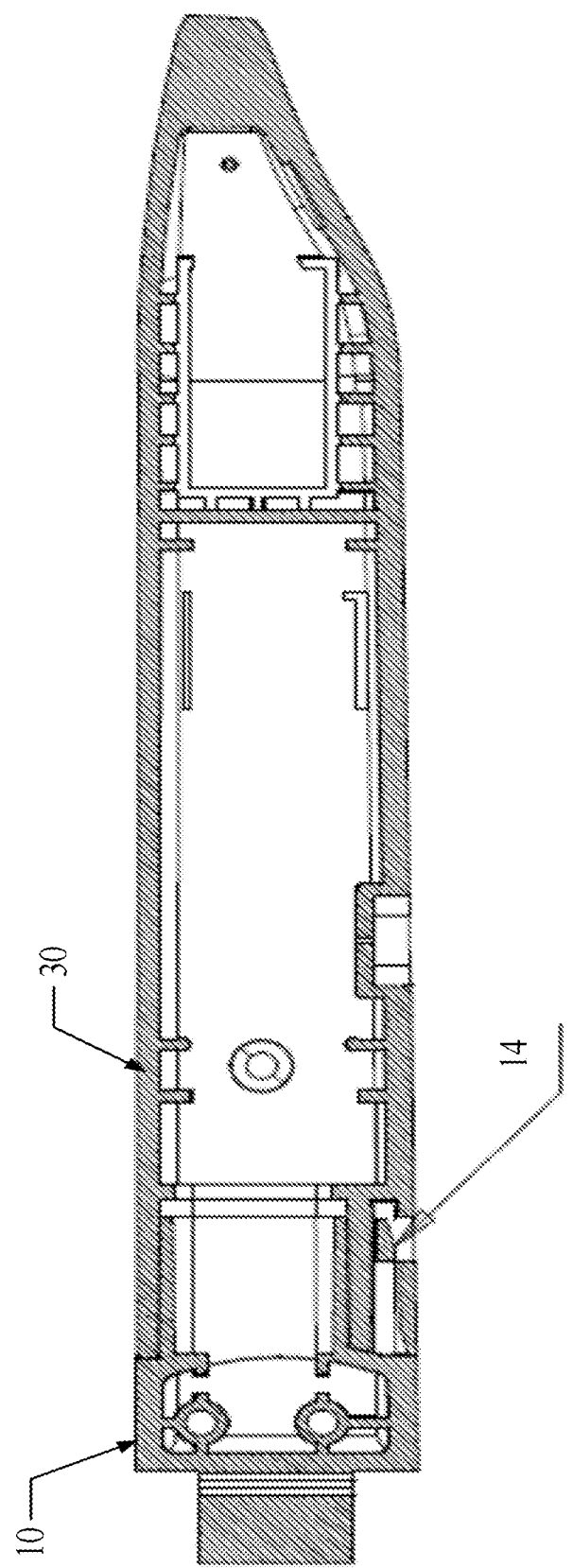
FIG. 10 is a cross-sectional view of a latch, wherein the male and female interfaces of the connecting assembly provided by the embodiment of the present invention are connected and the release button is pressed.
Figure 11:
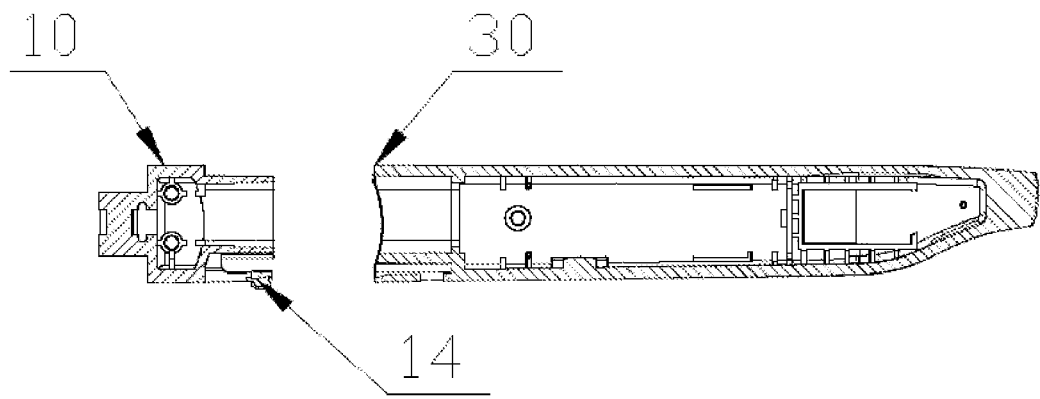
FIG. 11 is a cross-sectional view of the connecting assembly provided by the embodiment of the present invention, wherein the male and female interfaces are disconnected.

Further, referring to FIG. 8, in order to facilitate the disengagement of the male interface 15 and the female interface 35, and thus to separate the connecting assembly 10 and the electronic control assembly 30, a release button 16 is provided at a position of the outside of the electronic control assembly 30 corresponding to the latch 14, which is shown in FIG. 8. When a pressure directed to the latch 14 (i.e., a pressure making the latch 14 move inwardly relative to the outside of the electronic control assembly 30) acts on a surface of the release button 16, the latch 14 is linked at the same time, the male interface 15 and the female interface 35 are disengaged and disassembled, thereby the connecting assembly 10 and the electronic control assembly 30 are detached from each other. In details, referring to FIGS. 9-11, which are cross-sectional view of the male and female interfaces after connected, cross-sectional view of the latch after the release button is pressed, and cross-sectional view of the male and female interfaces after disassembled, respectively.

Figure 12:
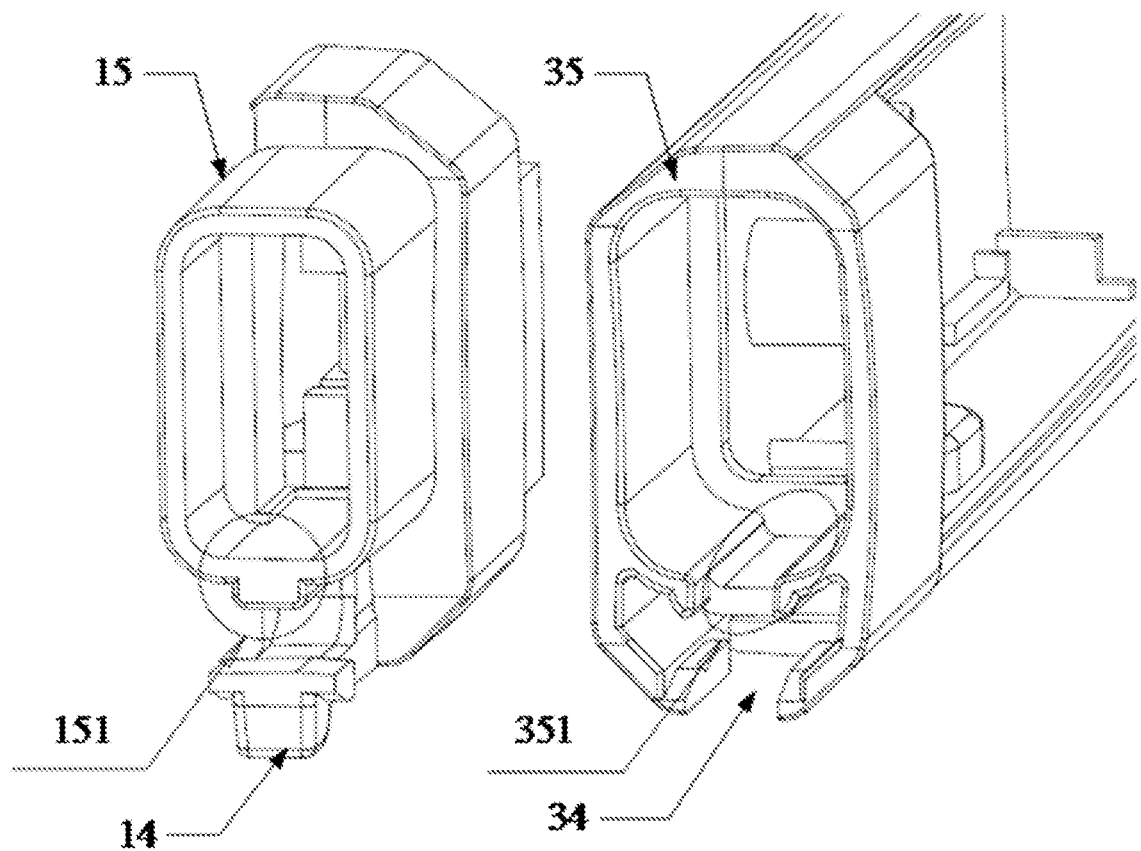
FIG. 12 is a schematic view of a guiding structure of the male and female interfaces of the connecting assembly provided by the embodiment of the present invention.

Further, referring to FIG. 12, in order to improve a connection efficiency of the male interface 15 and the female interface 35, FIG. 12 is a schematic view of a guiding structure of the male interface 15 and the female interface 35. The male interface 15 is provided with a first guiding groove 151, and the female interface 35 is provided with a second guiding groove 351 matching the first guiding groove 151. Preferably, the first guiding groove 151 is convex, while the second guiding groove 351 is concave. The first guiding groove is defined at a bottom of the male interface 15, which is closer to the latch 14 than a top of the male interface 15. Correspondingly, the second guiding groove 351 is defined at a bottom of the female interface 35.

Figure 13:
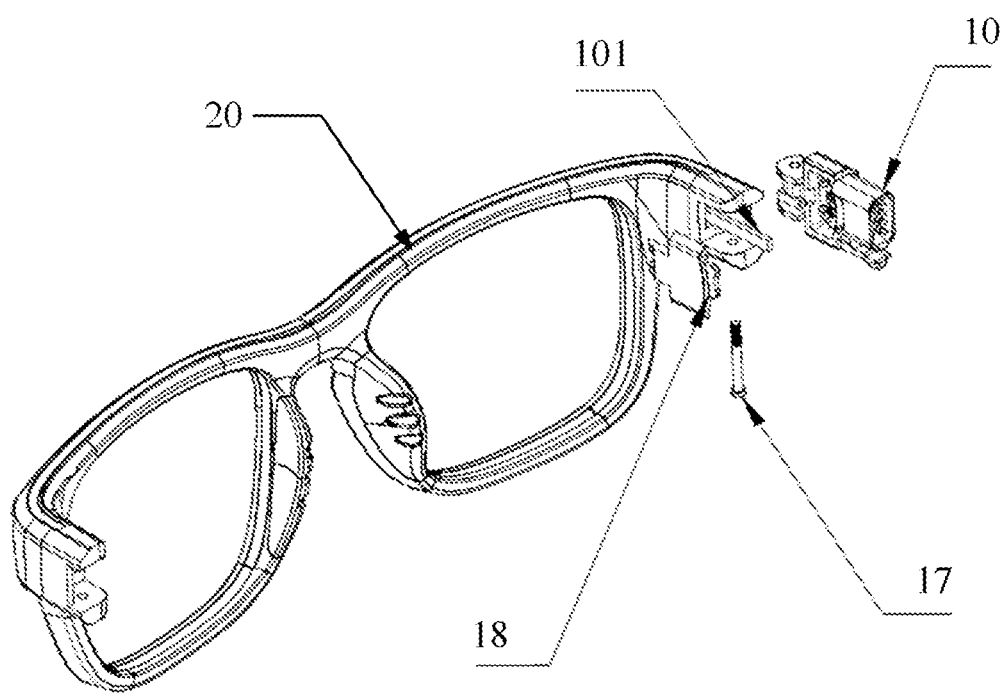
FIG. 13 is a schematic, exploded view of a main body assembly and the connecting assembly provided by the embodiment of the present invention.
Figure 14:
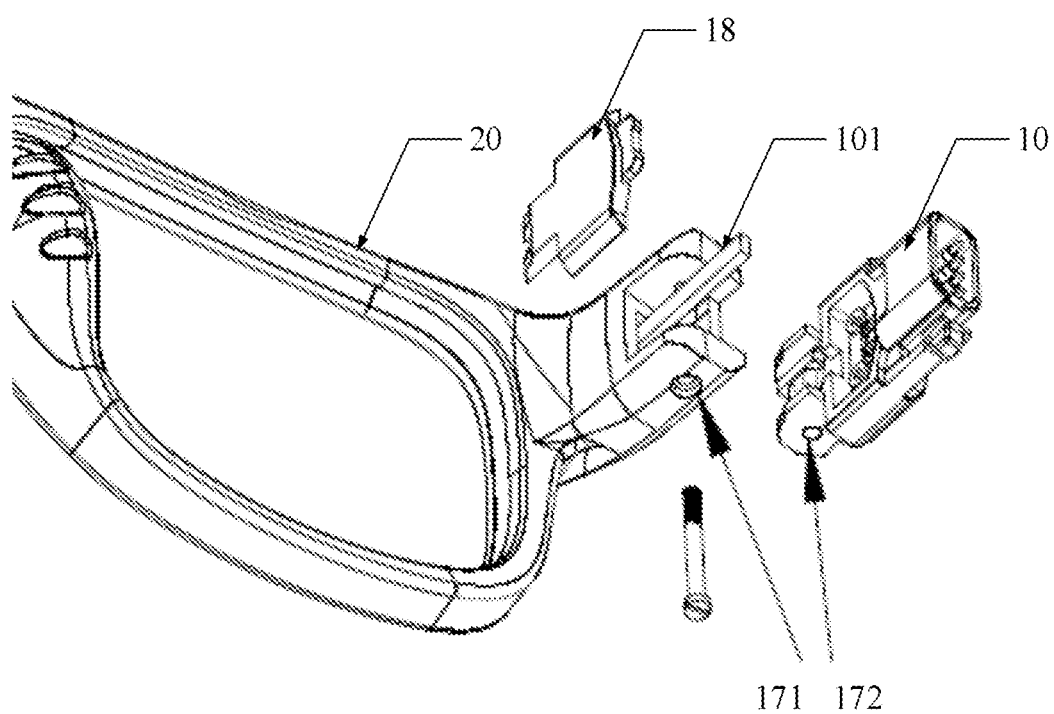
FIG. 14 is another schematic, exploded view of the main body assembly and the connecting assembly provided by the embodiment of the present invention.
Figure 15:
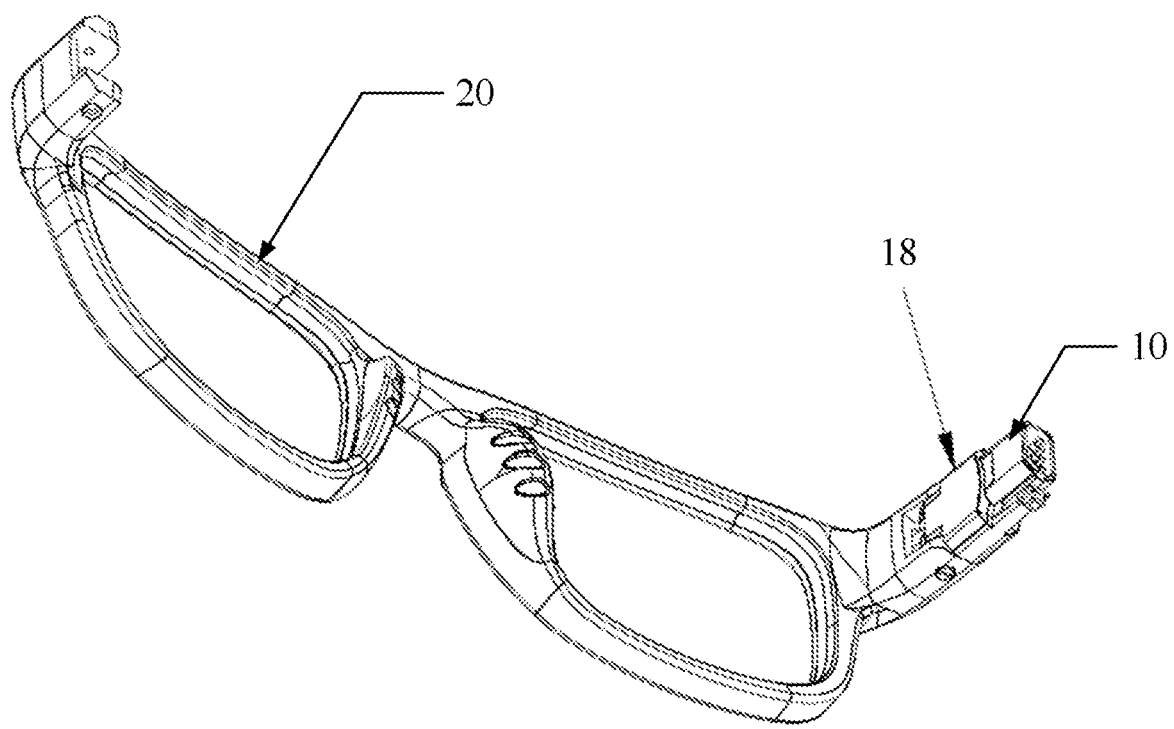
FIG. 15 is a schematic, assembled view of the main body assembly and the connecting assembly provided by the embodiment of the present invention.

Further, the connecting assembly 10 includes a rotary connecting shaft 17. Referring to FIG. 13 to FIG. 15, FIG. 13 is an exploded view of the connecting assembly and the main body assembly, FIG. 14 is another exploded view of the connecting assembly and the main body assembly, and FIG. 15 is a schematic diagram of the main body assembly and one connecting assembly after assembled.

The connecting end of the main body assembly 20 defines a first shaft hole 171, and the first connecting end of the connecting assembly 10 defines a second shaft hole 172. The rotary connecting shaft 17 extends through the first shaft hole 171 and the second shaft hole 172 to detachably connect the connecting end of the main body assembly 20 and the first connecting end of the connecting assembly 10 in the rotary shaft connection. Specifically, the rotary connecting shaft 17 may be a screw, and matching threads are formed inside the first shaft hole 171 and the second shaft hole 172. The connecting assembly 10 is rotatably connected to the main body assembly 20 within a rotation limiting range of the rotary connecting shaft 17. Specifically, taking the intelligent glasses as an example, the main body assembly 20 is the frame of the intelligent glasses, and the connecting assembly 10 is folded inwardly to the frame in the rotation limiting range of the rotation connecting shaft 17.

The main body assembly 20 includes an electric device, which needs a power supply. The power supply may be arranged in the electric control assembly 20. A passage is defined in the main body assembly 20 for accommodating power wires, and one end of the passage is open at the connecting end of the main body assembly 20. The power wires 101 of the electric device extend outwardly through the connecting end of the main body assembly 20, and are detachably connected to the first connector 11 of the connecting assembly 10, facilitating removing of the power wires 101 from the first connector 11 when the main body assembly 20 and the connecting assembly 10 are disassembled. Further, the connecting assembly 10 further includes an observing window and a cover 18 detachably packaged on the observing window. The cover 18 may be made of a hard material, has a snap-fit structure matching the observing window, thereby covering the observing window by the snap-fit connection. Alternatively, the cover 18 may be made of a soft material with a certain deformation capacity, and has a volume slightly larger than that of the observing window. The cover 18 is combined with the observing window by interference, and is covered on the observing window by pressing force, which is easy to disassemble and has a function of dust-proof. The observing window is defined at a position where the power wires 101 and the first connector 11 are connected, which is convenient for the user to observe when the power wires 101 are connected to or disconnected from the first connector 11.

Further, referring to FIG. 4 and FIG. 5, in the connecting assembly 10, the male pogopins 12 are welded to a connection plate (not labeled in the drawings), and the power wires 101 are detachably mounted on the connection plate.

In this embodiment, a detachable end of the connecting assembly 10 is connected to the main body assembly 20, and the other end of the connecting assembly 10 is connected to the electronic control assembly 30. The main body assembly 20 includes the electric device, and the power wires of the electric device extend outwardly from the connecting end of the main body assembly 20, may be one connecting end or two connecting ends of the main body assembly 20, and are detachably connected to the first connector 11 of the connecting assembly 10. The first connector 11 and the second connector 31 can connected by the magnetic attracting force between the magnets, meanwhile the connecting assembly 10 and the electronic control assembly 30 are also connected by the magnetic attracting force. Alternatively, the connecting assembly 10 and the electronic control assembly 30 are engaged by the male interface 15 and the female interface 35, and there is no magnet between the first connector 11 and the second connector 31, the first connector 11 and the second connector 31 are in close contact under the action of the engaging force. Contact surfaces of the first connector 11 and the second connector 31 are respectively provided with the male pogopins 12 and the female interface male pogopins 32 made of conductive materials. When the first connector 11 and the second connector 31 are in contact, the male pogopins 12 and the female pogopins 32 contact each other, thereby realizing electrical connection of the first connector 11 and the second connector 31. Well, the first connector 11 and the second connector 31 may be connected by the magnetic attraction between the magnets, the connection assembly 10 and the electronic control assembly 30 are engaged by the male interface 15 and the female interface 35, these two connecting modes may coexist, and the connection is more firmly. The electric control assembly 30 is provided with the power supply and/or the control circuit board, which can realize supply power or electric control to the main body assembly 20 after the first connector 11 and the second connector 31 are electrically connected.

The connecting assembly, the main body assembly and the electronic control assembly of the assembly-detachable intelligent apparatus provided in this embodiment can be detached from each other, and any one of the assemblies can be replaced separately, which improves the convenience for replacing the assemblies. Meanwhile, by means of electrical connection of the first connector and the second connector, the power supply, electronic control and other functions of the electronic control component to the main component are ensured. Taking the intelligent glasses as an example of the assembly-detachable intelligent apparatus, the frame, the rotary shaft and legs of the intelligent glasses can be detached from each other, which facilitates the replacement of the frame with different styles, colors and functions, or with a new one when the frame is broken for avoiding to affect the use of the intelligent glasses, improving the convenience of glasses; and, facilitates the replacement of the legs with sufficient power or control circuit board. For the two legs, only one side may be connected with one leg incorporating the power supply; or, both sides may be connected with the legs incorporating the power supply, and in this situation two connecting ends of the frame should be provided with power wires to connect two rotary shafts. When the leg with sufficient power is replaced with the leg with insufficient power, only one leg with insufficient power may be replaced, or two legs with insufficient power may be replaced at the same time, without affecting the current use of the intelligent glasses.

The present invention further provides an assembly-detachable intelligent apparatus, which includes a connection assembly, a main body assembly and an electronic control assembly, i.e., the connection assembly 10, the main body assembly 20 and the electronic control assembly 30 described in the previous embodiment. Taking the intelligent glasses as an example of the assembly-detachable intelligent apparatus, a construction thereof refers to FIG. 2.

The specific construction of the assembly-detachable intelligent apparatus refers to FIGS. 1 to 15. Specifically, the connecting assembly 10 includes a first connector 11, a connecting end of the main body assembly 20 is detachably connected to a first connecting end of the connecting assembly 10 in a first connection mode, and the main body assembly 20 is electrically connected to the first connector 11. The electronic control assembly 30 includes a second connector 31, a second connecting end of the connecting assembly 10 and a connecting end of the electronic control assembly 30 are detachably connected in a second connecting mode and/or a third connecting mode, and the first connector 11 and the second connector 12 are electrically connected.

The first connecting mode may be rotary shaft connection, the second connecting mode may be magnetic attraction connecting mode, and the third connecting mode may be snap-fit connection. The magnetic attraction may be applied separately: magnetic objects with opposing magnetic poles are respectively arranged on surfaces of the first connector 11 and the second connector 31 which face to each other, making the first connector 11 and the second connector 31 be connected together by magnetic attracting force generated therebetween. At this time, the second connecting end of the connecting assembly 10 and the connecting end of the electronic control assembly 30 may be without a snap-fit structure, and are directly connected together by the magnetic attracting force. The snap-fit connection also may be applied separately: the second connecting end of the connecting assembly 10 includes a male interface 15 with a latch 14, and the connecting end of the electronic control assembly 30 includes a female interface 35 matching the male interface 15. By means of the snap-fit of the male interface 15 and the female interface 35, the second connecting end of the connecting assembly 10 is inserted into the connecting end of the electronic control assembly 30, thereby snapped together. The snap-fit connection may be longitudinal snap-fit, or may be horizontal snap-fit. The magnetic attraction and the snap-fit connection may be applied simultaneously, i.e., the second connecting end of the connecting assembly 10 and the connecting end of the electronic control assembly 30 are detachably connected together by the magnetic attracting force between the first connector 11 and the second connector 31 and the snap force between the male interface and the female interface, which is more firmly compared with using alone one of the magnetic attraction and snap-fit connection.

The connecting assembly 10, the main body assembly 20, the electronic control assembly 30, the first connector 11, the second connector 31, the male interface 15 and the female interface 35 are the same in construction as those described in the previous embodiment, and will not be repeated here.

Further, a power supply and a control circuit board are arranged on the electronic control component 30. Specifically, the power supply may be a rechargeable power supply, and the control circuit board is a PCB with control circuits. In an embodiment, the assembly-detachable intelligent apparatus is a pair of intelligent glasses, and the control circuit is used for controlling a display visual effect of the frame on the lenses of the intelligent glasses. The connecting assembly 10 is the rotary shaft of the intelligent glasses, the main body assembly 20 is the frame of the intelligent glasses, and the electronic control component 30 is the leg of the intelligent glasses. It may be that one of the two legs of the intelligent glasses is provided with the rechargeable power supply, and the other leg is provided with the PCB. Alternatively, both the rechargeable power supply and the PCB may be provided in the same leg.

Figure 16:
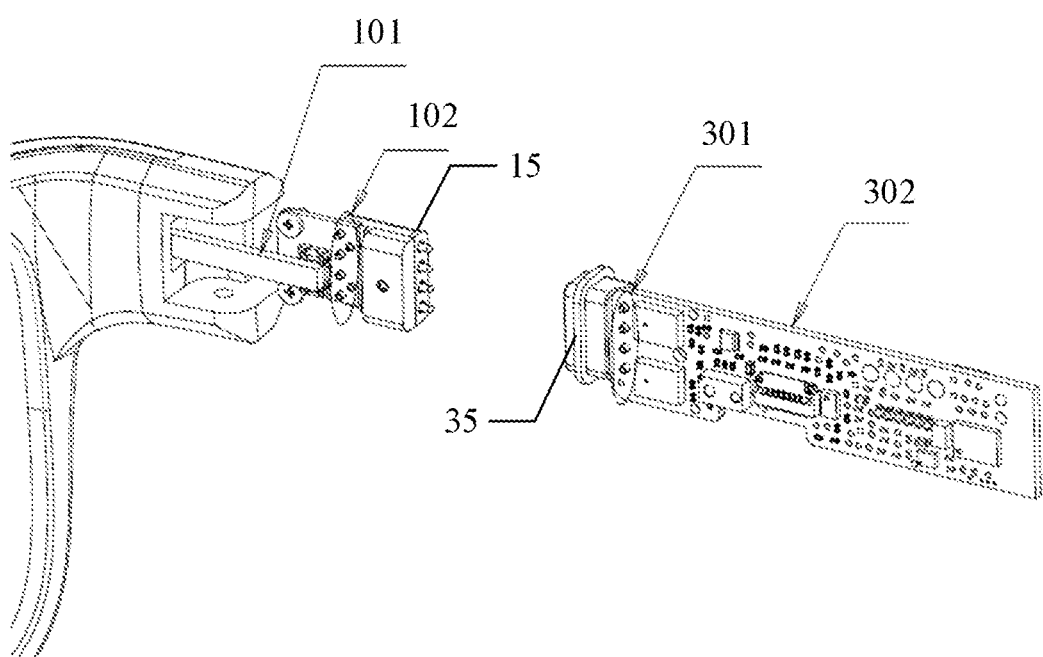
FIG. 16 is a schematic view of the connecting assembly and electric control assembly of an intelligent apparatus provided by the embodiment of the present invention.

Further, referring to FIG. 16, FIG. 16 is a schematic view of electrical connection of the assembly-detachable intelligent apparatus. A connecting plate of the connecting assembly 10, which is connected to the power wires 101 of the main body assembly 20, is welded to the male interface 15 through welding spots 102, and a control circuit board 302 of the electronic control assembly 30 is welded to the female interface 35 through welding spots 301.

The connecting assembly, the main body assembly and the electronic control assembly of the assembly-detachable intelligent apparatus provided in this embodiment can be detached from each other, and any one of the assemblies can be replaced separately. Taking the intelligent glasses as an example of the assembly-detachable intelligent apparatus, the frame, the rotary shaft and the legs of the intelligent glasses can be detached from each other, which facilitates the replacement of the frame with different styles, colors and functions, or with a new one when the frame is broken for avoiding to affect the use of the intelligent glasses, improving the convenience of the glasses; and, facilitates the replacement of the legs with sufficient power or control circuit board. For the two legs, only one side may be connected with one leg incorporating the power supply; or, both sides may be connected with the legs incorporating the power supply, and in this situation two connecting ends of the frame should be provided with power wires to connect two rotary shafts. When the leg with sufficient power is replaced with the leg with insufficient power, only one leg with insufficient power may be replaced, or two legs with insufficient power may be replaced at the same time, without affecting the current use of the intelligent glasses. After replacement, the legs with insufficient power can be charged at any time with a portable charger, thus to replace in time when the power of the intelligent glasses is insufficient next time.

Since each assembly of the above-mentioned assembly-detachable intelligent apparatus can be replaced separately, it not only reducing production costs and time costs, but also can test the frame and the legs separately during the performance test. Compared with the integral intelligent apparatus, it is easier to find problems, improving the detection efficiency.

In this embodiment, the assembly-detachable intelligent apparatus includes a main body assembly, a connecting assembly and an electronic control assembly. The connecting assembly includes a first connector, and the electronic control assembly includes a second connector. One end of the connecting assembly is detachably connected to the main body assembly in a first connecting mode, the other end of the connecting assembly is detachably connected to the electronic control assembly in a second connecting mode and/or a third connecting mode. The main body assembly is electrically connected to the first connector, and the first connector is electrically connected to the second connector. Connections between the main body assembly and the first connector and between the first connector and the second connector are in detachable mode, which improves the convenience of replacing the assemblies, meanwhile ensures functions of power supply, electric control and etc. of the electronic control assembly to the main body assembly through the electrical connection of the first connector and the second connector.

In the above embodiments, description to each embodiment has its own emphasis. For a portion not described in details in one embodiment, please refer to the relevant description of other embodiments.

The above is the description of the connecting assembly and the assembly-detachable intelligent apparatus provided by the present invention. For those skilled in the art, modifications may be made to the embodiments and applied ranges according to the ideas of the embodiments of the present invention. In conclusion, the contents of this specification should not be understood as a limitation to the present invention.

What is claimed is:

1. A connecting assembly, configured for connecting a main body assembly and an electronic control assembly of an assembly-detachable intelligent apparatus, comprising a first connector;
    a first connecting end of the connecting assembly being detachably connected to a connecting end of the main body assembly in a first connecting mode, and the main body assembly being electrically connected to the first connector;
    the electronic control assembly comprising a second connector, a second connecting end of the connecting assembly being detachably connected to a connecting end of the electronic control assembly in a second connecting mode and/or a third connecting mode, and the first connector being electrically connected to the second connector;
    wherein, after the second connecting end of the connecting assembly and the connecting end of the electronic control assembly are connected, the connecting assembly and the electronic control assembly are prevented from disengaging from each other by a latch; and
    wherein a release button is provided at a position of the outside of the electronic control assembly corresponding to the latch, when a pressure is applied on a surface of the release button, the latch is linked, and the male interface and the female interface are disengaged.

2. The connecting assembly of claim 1, wherein male pogopins are provided at an outside of the connecting end of the first connector, and female pogopins are provided at an outside of the connecting end of the second connector; wherein when the first connector and the second connector are connected, the male pogopins and the female pogopins contact with each other, and the first connector and the second connector are electrically connected.

3. The connecting assembly of claim 2, wherein a magnetic member with a first magnetic pole is provided at the outside of the connecting end of the first connector, a magnetic member with a second magnetic pole opposite to the first magnetic pole is provided at the outside of the connecting end of the second connector, and the second connecting end of the connecting assembly is detachably connected to the connecting end of the electronic control assembly by magnetic attraction through attraction of the first magnetic pole and the second magnetic pole.

4. The connecting assembly of claim 3, wherein a male interface with the latch is provided at the second connecting end of the connecting assembly, a female interface matching the male interface is provided at the connecting end of the electronic control assembly, the second connecting end of the connecting assembly and the connecting end of the electronic control assembly are detachably connected by snap-fit connection, and the latch prevents the male interface disengaging from the female interface after the male interface and the female interface are connected.

5. The connecting assembly of claim 1, wherein the male interface is provided with a first guiding groove, and the female interface is provided with a second guiding groove matching the first guiding groove.

6. The connecting assembly of claim 5, wherein the connecting assembly further comprises a rotary connecting shaft, the connecting end of the main body assembly defines a first shaft hole, the first connecting end of the connecting assembly defines a second shaft hole, the rotary connecting shaft extends through the first shaft hole and the second shaft hole to detachably connect the connecting end of the main body assembly and the first connecting end of the connecting assembly in a rotary shaft connection, and the connecting assembly is rotatably connected to the main body assembly within a rotation limiting range of the rotary connecting shaft.

7. The connecting assembly of claim 1, wherein the main body assembly comprises an electric device, and power wires of the electric device extend outwardly through the connecting end of the main body assembly and are detachably connected to the first connector of the connecting assembly.

8. The connecting assembly of claim 7, wherein the connecting assembly further comprises an observing window and a cover detachably packaged on the observing window, the observing window is defined at a position where the power wires and the first connector are connected.

9. An assembly-detachable intelligent apparatus, comprising a main body assembly, an electronic control assembly and a connecting assembly;
    the connecting assembly comprising a first connector, a connecting end of the main body assembly being detachably connected to a first connecting end of the connecting assembly in a first connecting mode, and the main body assembly being electrically connected to the first connector;

the electronic control assembly comprising a second connector, a second connecting end of the connecting assembly being detachably connected to a connecting end of the electronic control assembly in a second connecting mode and/or a third connecting mode, and the first connector being electrically connected to the second connector;

wherein, after the second connecting end of the connecting assembly and the connecting end of the electronic control assembly are connected, the connecting assembly and the electronic control assembly are prevented from disengaging from each other by a latch; and wherein a release button is provided at a position of the outside of the electronic control assembly corresponding to the latch, when a pressure is applied on a surface of the release button, the latch is linked, and the male interface and the female interface are disengaged.

10. The assembly-detachable intelligent apparatus of claim 9, wherein a rechargeable power supply and a control circuit board are provided on the electronic control component.

11. The assembly-detachable intelligent apparatus of claim 9, wherein the assembly-detachable intelligent apparatus is intelligent glasses, the main body assembly is a frame of the intelligent glasses, and the connecting assembly is a rotary shaft interconnecting the frame and legs of the intelligent glasses.

12. The assembly-detachable intelligent apparatus of claim 9, wherein male pogopins are provided at an outside of the connecting end of the first connector, and female pogopins are provided at an outside of the connecting end of the second connector; wherein when the first connector and the second connector are connected, the male pogopins and the female pogopins contact with each other, and the first connector and the second connector are electrically connected.

13. The assembly-detachable intelligent apparatus of claim 12, wherein a magnetic member with a first magnetic pole is provided at the outside of the connecting end of the first connector, a magnetic member with a second magnetic pole opposite to the first magnetic pole is provided at the outside of the connecting end of the second connector, and the second connecting end of the connecting assembly is detachably connected to the connecting end of the electronic control assembly by magnetic attraction through attraction of the first magnetic pole and the second magnetic pole.

14. The connecting assembly of claim 13, wherein a male interface with the latch is provided at the second connecting end of the connecting assembly, a female interface matching the male interface is provided at the connecting end of the electronic control assembly, the second connecting end of the connecting assembly and the connecting end of the electronic control assembly are detachably connected by snap-fit connection, and the latch prevents the male interface disengaging from the female interface after the male interface and the female interface are connected.

15. A connecting assembly, configured for connecting a main body assembly and an electronic control assembly of an assembly-detachable intelligent apparatus, comprising a first connector;

a first connecting end of the connecting assembly being detachably connected to a connecting end of the main body assembly in a first connecting mode, and the main body assembly being electrically connected to the first connector;

the electronic control assembly comprising a second connector, a second connecting end of the connecting assembly being detachably connected to a connecting end of the electronic control assembly in a second connecting mode and/or a third connecting mode, and the first connector being electrically connected to the second connector;

wherein male pogopins are provided at an outside of the connecting end of the first connector, and female pogopins are provided at an outside of the connecting end of the second connector; wherein when the first connector and the second connector are connected, the male pogopins and the female pogopins contact with each other, and the first connector and the second connector are electrically connected;

wherein a magnetic member with a first magnetic pole is provided at the outside of the connecting end of the first connector, a magnetic member with a second magnetic pole opposite to the first magnetic pole is provided at the outside of the connecting end of the second connector, and the second connecting end of the connecting assembly is detachably connected to the connecting end of the electronic control assembly by magnetic attraction through attraction of the first magnetic pole and the second magnetic pole;

wherein a male interface with a latch is provided at the second connecting end of the connecting assembly, a female interface matching the male interface is provided at the connecting end of the electronic control assembly, the second connecting end of the connecting assembly and the connecting end of the electronic control assembly are detachably connected by snap-fit connection, and the latch prevents the male interface disengaging from the female interface after the male interface and the female interface are connected; and wherein a release button is provided at a position of the outside of the electronic control assembly corresponding to the latch, when a pressure is applied on a surface of the release button, the latch is linked, and the male interface and the female interface are disengaged.

16. The connecting assembly of claim 15, wherein the male interface is provided with a first guiding groove, and the female interface is provided with a second guiding groove matching the first guiding groove.

17. The connecting assembly of claim 16, wherein the connecting assembly further comprises a rotary connecting shaft, the connecting end of the main body assembly defines a first shaft hole, the first connecting end of the connecting assembly defines a second shaft hole, the rotary connecting shaft extends through the first shaft hole and the second shaft hole to detachably connect the connecting end of the main body assembly and the first connecting end of the connecting assembly in a rotary shaft connection, and the connecting assembly is rotatably connected to the main body assembly within a rotation limiting range of the rotary connecting shaft.

18. The connecting assembly of claim 15, wherein the main body assembly comprises an electric device, and power wires of the electric device extend outwardly through the connecting end of the main body assembly and are detachably connected to the first connector of the connecting assembly.

19. The connecting assembly of claim 18, wherein the connecting assembly further comprises an observing window and a cover detachably packaged on the observing window, the observing window is defined at a position where the power wires and the first connector are connected.

* * * * *